United States Patent

Taranta

(10) Patent No.: US 9,568,318 B2
(45) Date of Patent: Feb. 14, 2017

(54) ROTATIONALLY BIASED FIBER OPTIC GYROSCOPE

(71) Applicant: Honeywell International Inc., Morristown, NJ (US)

(72) Inventor: Austin Taranta, Scottsdale, AZ (US)

(73) Assignee: Honeywell International Inc., Morris Plains, NJ (US)

(*) Notice: Subject to any disclaimer, the term of this patent is extended or adjusted under 35 U.S.C. 154(b) by 0 days.

(21) Appl. No.: 14/693,241

(22) Filed: Apr. 22, 2015

(65) Prior Publication Data

US 2016/0313125 A1 Oct. 27, 2016

(51) Int. Cl.
*G01C 19/72* (2006.01)

(52) U.S. Cl.
CPC .................. *G01C 19/726* (2013.01)

(58) Field of Classification Search
CPC ... G01C 19/726; G01C 19/728; G01C 19/662; G01C 19/664; G01C 19/68; G01C 19/70
USPC .......................... 356/462, 472, 474, 475, 476
See application file for complete search history.

(56) References Cited

U.S. PATENT DOCUMENTS

| 4,135,822 | A | 1/1979 | Ezekiel |
| 4,981,359 | A | 1/1991 | Tazartes et al. |
| 5,131,750 | A | 7/1992 | Gravel et al. |
| 5,159,575 | A | 10/1992 | Winston, Jr. |
| 5,173,745 | A | 12/1992 | Hanse |
| 5,416,584 | A | 5/1995 | Kay |
| 5,684,591 | A | 11/1997 | Lo et al. |
| 6,002,481 | A | 12/1999 | Bielas et al. |
| 6,448,552 | B1 * | 9/2002 | Mizutani ............... G01C 19/66 250/214 R |
| 6,476,918 | B1 | 11/2002 | Killpatrick |

(Continued)

FOREIGN PATENT DOCUMENTS

CN 103884352 6/2014

OTHER PUBLICATIONS

Volk et al., "Northrop Grumman's Family of Fiber-optic Based Inertial Navigation Systems", 2006, pp. 382-389, Publisher: IEEE.

(Continued)

*Primary Examiner* — Tarifur Chowdhury
*Assistant Examiner* — Jonathon Cook
(74) *Attorney, Agent, or Firm* — Fogg & Powers LLC (57) ABSTRACT

A system for rotationally biasing a fiber optic gyroscope includes a fiber optic gyroscope assembly comprising a light source that emits an optical signal, an optical coupler in optical communication with the light source, and a fiber optic coil in optical communication with the light source. The fiber optic coil receives the optical signal through the optical coupler and imparts a phase shift proportional to rotation. A rate sensing detector in optical communication with the fiber optic coil receives the optical signal from the fiber optic coil through the optical coupler. A motor coupled to the fiber optic coil applies a periodic rotation to the fiber optic coil to impart a biasing phase modulation to the optical signal. A signal processing unit is coupled to the fiber optic gyroscope assembly and the motor. The signal processing unit converts a measured intensity of the optical signal to rotation rate data.

16 Claims, 10 Drawing Sheets

(56) References Cited

U.S. PATENT DOCUMENTS

| | | | | |
|---|---|---|---|---|
| 6,688,174 B1* | 2/2004 | Gallon | ................ | G01C 19/668 |
| | | | | 73/493 |
| 7,505,140 B2 | 3/2009 | Tchertkov et al. | | |
| 7,548,318 B2 | 6/2009 | Tchertkov et al. | | |
| 7,633,626 B2 | 12/2009 | Pavlath et al. | | |
| 8,542,364 B1* | 9/2013 | Keith | ................ | G01C 19/726 |
| | | | | 356/460 |
| 2009/0002712 A1 | 1/2009 | Huang | | |

OTHER PUBLICATIONS

European Patent Office, "Extended European Search Report from EP Application No. 16164770.6 mailed Sep. 26, 2016", from Foreign Counterpart of U.S. Appl. No. 14/693,241, Sep. 26, 2016, pp. 1-9, Published in: EP.

* cited by examiner

ROTATIONALLY BIASED FIBER OPTIC GYROSCOPE

BACKGROUND

The standard interferometric fiber optic gyroscope (IFOG) requires some mechanism for phase modulating in order to move the operating point of the interferometer onto the more sensitive points of the intensity versus phase curve, at which there is also sign differentiation. The standard method of imparting a biasing phase modulation to counter propagating light waves in an IFOG is to use an optical phase modulator, such as a lithium niobate electro-optic modulator or a fiber-stretching piezo modulator. Since both of these technologies are direct optical phase modulators, they operate in the optical path and can have unwanted side effects, such as residual intensity modulation, optical attenuation, wavelength dependent loss, and the like.

SUMMARY

A system for rotationally biasing a fiber optic gyroscope is provided. The system includes a fiber optic gyroscope assembly that comprises a light source configured to emit an optical signal, an optical coupler in optical communication with the light source, and a fiber optic coil in optical communication with the light source. The fiber optic coil is configured to receive the optical signal through the optical coupler and impart a phase shift proportional to rotation. A rate sensing detector in optical communication with the fiber optic coil is configured to receive the optical signal from the fiber optic coil through the optical coupler. A motor operatively coupled to the fiber optic coil is configured to apply a periodic rotation to the fiber optic coil to impart a biasing phase modulation to the optical signal. A signal processing unit is operatively coupled to the fiber optic gyroscope assembly and the motor. The signal processing unit is configured to convert a measured intensity of the optical signal to rotation rate data.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which.

DETAILED DESCRIPTION

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

A system and method for rotationally biasing a fiber optic gyroscope are provided that increases the sensitivity of the fiber optic gyroscope. The system and method provide a mechanical bias modulation technique for the fiber optic gyroscope, such as an IFOG, which employs phase biasing through rotation (Sagnac effect).

In one approach, a fiber optic coil of the IFOG is physically rotated or dithered through a known, periodic angle in order to increase the sensitivity to an unknown rotation rate that is being measured. Physically rotating or dithering the fiber optic coil requires no intrusion into the optical path, such as by using an optical phase modulator, and therefore has zero excess optical loss and secondary effects.

In another approach, a single rotation can be used to simultaneously bias multiple fiber optic coils having orthogonal input axes, such as in an inertial measurement unit (IMU), by applying the rotation to a common mounting platform. This is in contrast to the state-of-the-art in which a single phase modulator must be used for a single fiber optic coil.

The present system generally includes a light source that generates an optical signal, a fiber optic coil optically coupled to the light source and configured to impart a Sagnac phase shift proportional to rotation, and a motor that periodically rotates, vibrates, or dithers the fiber optic coil to impart a biasing phase modulation to the optical signal. The system also includes a fiber optic gyroscope front/back-end comprised of a splitter/recombiner (for the counter-propagating optical waves), photodetector (for interfering the signals), and signal processing electronics for converting the measured intensity to equivalent rotation.

In one embodiment, biasing rotation of the IFOG can be accomplished by a dither motor mounted on the fiber coil hub. Alternatively, a dither motor can be mounted on a common platform to simultaneously bias multiple fiber optic coils or an entire IMU. A further enhancement may be implemented by using an optical encoder, piezo-electric transducer, or other mechanism for detecting the biasing rotation angle from the rotated platform, and using that measured rotation angle signal in demodulating the detected intensity.

Further details of the present system and method are described hereafter with reference to the drawings.

Figure 1:
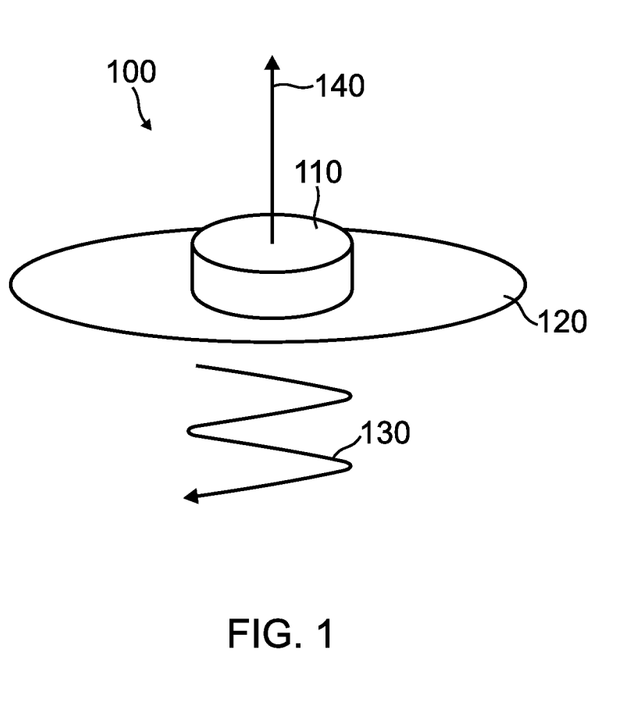
FIG. 1 is a schematic diagram of a system for rotationally biasing a fiber optic gyroscope according to one embodiment.

FIG. 1 illustrates generally a system 100 for rotationally biasing a fiber optic gyroscope assembly 110, such as part or all of an IFOG. For example, gyroscope assembly 110 can include a fiber optic coil housed in a cylindrical shell as part of an IFOG, or can include the entire IFOG assembly. In one embodiment, gyroscope assembly 110 is mounted on a motorized platform 120, to which a dither motion 130 is applied about the gyro input axis 140, thereby imparting a biasing phase modulation to the counter-propagating optical signals in the fiber optic coil of gyroscope assembly 110.

Figure 2:
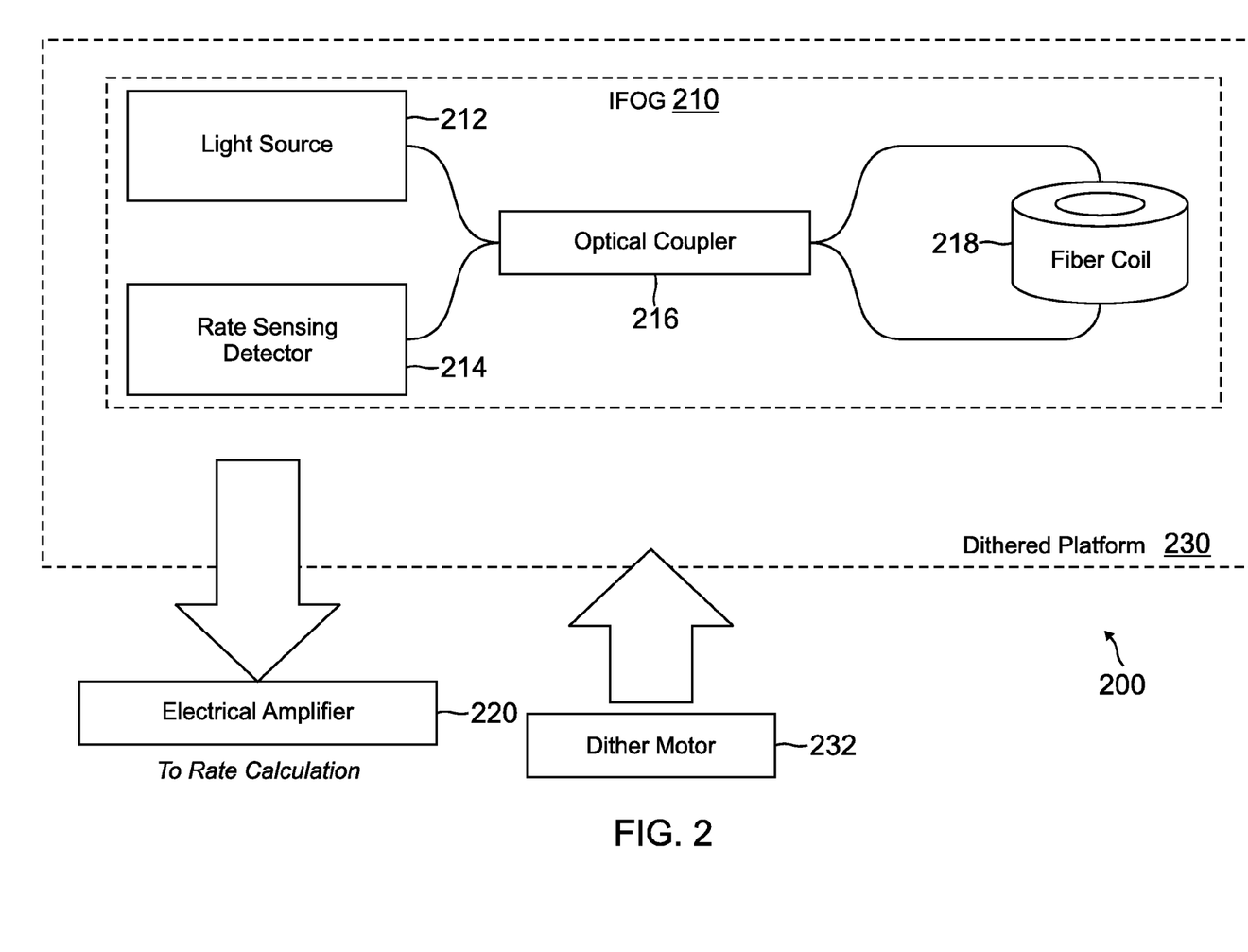
FIG. 2 is a block diagram of a system for rotationally biasing a fiber optic gyroscope according to one embodiment.

FIG. 2 illustrates further details of a system 200 for rotationally biasing a fiber optic gyroscope such as an IFOG 210 according to one embodiment. The basic architecture of IFOG 210 includes a light source 212, such as a laser, fiber light source, or a superluminescent diode (SLD); a rate sensing detector 214; an optical coupler 216 such as a 2×2 optical coupler; and a fiber optic coil 218. The light source 212 and rate sensing detector 214 are each in optical communication with fiber optic coil 218 through optical fibers or waveguides coupled to optical coupler 216. The fiber optic coil 218 is configured to impart a phase shift proportional to rotation.

During operation, light source 212 transmits an optical signal to fiber optic coil 218 through optical coupler 216. A returning optical signal is sent from fiber optic coil 218 back through optical coupler 216, which directs the returning optical signal to rate sensing detector 214. The rate sensing detector 214 converts the optical signal to an electrical signal that is sent to an electrical amplifier 220, which directs the amplified electrical signal to a processor for rotation rate calculation.

The IFOG 210 is mounted on a dithered platform 230, which is configured to impart a periodic bias rotation angle to IFOG 210. The platform 230 can be coupled to a dither motor 232, such as a stepper motor or piezo-electric motor, which imparts a periodic mechanical dither at an appropriate frequency for fiber optic coil 218. For example, dither motor 232 can produce high frequency displacement of fiber optic coil 218 through acoustic or ultrasonic vibration.

Figure 3:
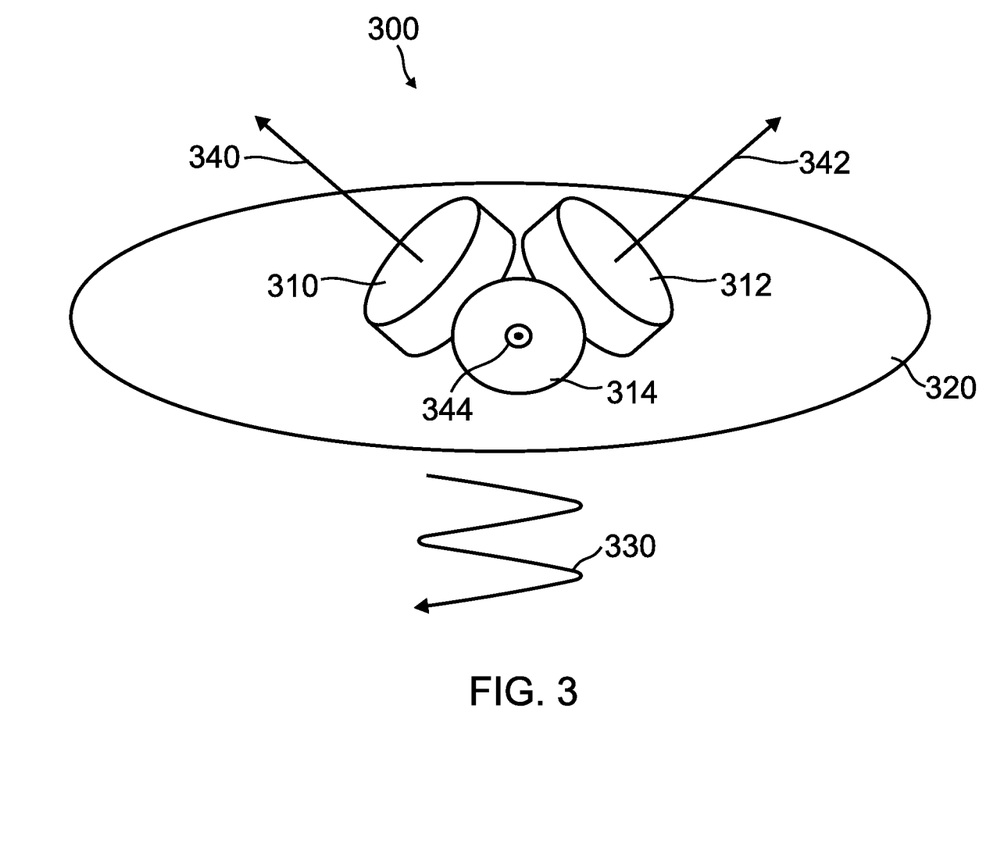
FIG. 3 is a schematic diagram of a system for rotationally biasing a fiber optic gyroscope according to another embodiment.

FIG. 3 illustrates generally a system 300 for rotationally biasing multiple fiber optic gyroscope assemblies 310, 312, and 314, which can include portions or all of multiple IFOG assemblies that are part of a three-axis IMU. For example, gyroscope assemblies 310, 312, and 314 can each include respective fiber optic coils housed in cylindrical shells as part of respective IFOGs, or can include the entire IFOG assemblies. In one embodiment, gyroscope assemblies 310, 312, and 314 having substantially orthogonal input axes 340, 342, and 344 respectively, are mounted on a common motorized platform 320. A dither motion 330 is applied to platform 320 to impart a biasing rotation angle to gyroscope assemblies 310, 312, and 314. The biasing rotation angle of platform 320 can be measured with an optical encoder, piezo-electric transducer, or the like.

Figure 4:
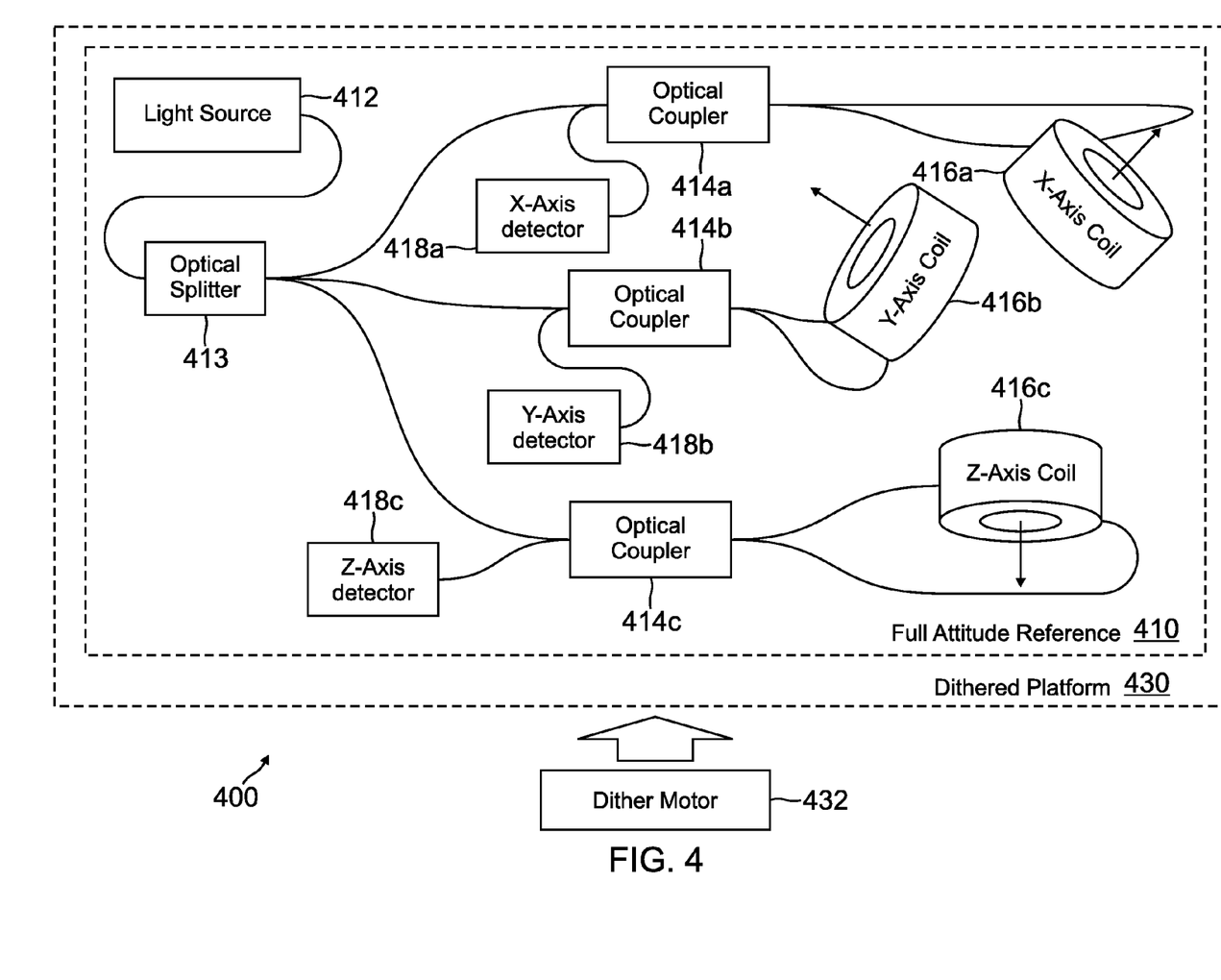
FIG. 4 is a block diagram of a system for rotationally biasing a fiber optic gyroscope according to another embodiment.

FIG. 4 illustrates further details of a system 400 for rotationally biasing multiple fiber optic gyroscope assemblies in a full attitude reference apparatus 410, such as a three-axis IMU, according to one embodiment. The basic architecture of reference apparatus 410 includes a light source 412, such as a laser fiber light source or an SLD, an optical splitter 413 such as a 1×3 optical splitter, a set of optical couplers 414a, 414b, 414c, such as 2×2 optical couplers, a set of fiber optic coils 416a, 416b, 416c, such as an x-axis coil, a y-axis coil, and a z-axis coil, and a set of rate sensing detectors 418a, 418b, 418c, such as an x-axis detector, a y-axis detector, and a z-axis detector. The light source and rate sensing detectors are each in optical communication with the fiber optic coils through optical fibers or waveguides coupled to the respective optical couplers.

During operation, light source 412 transmits an optical signal to optical splitter 413, which transmits portions of the optical signal to each of optical couplers 414a, 414b, 414c, which in turn transmit the respective portions of the optical signal to fiber optic coils 416a, 416b, 416c. Returning optical signals are sent from each of fiber optic coil 416a, 416b, 416c back through respective optical couplers 414a, 414b, 414c, which directs the returning optical signals to respective rate sensing detectors 418a, 418b, 418c. The rate sensing detectors then convert the respective optical signals to electrical signals that are used for rate calculation of each individual axis.

The reference apparatus 410 is mounted on a dithered platform 430, which is configured to impart a dither rotation angle to reference apparatus 410. The platform 430 can be coupled to a dither motor 432, such as a stepper motor or piezo-electric motor, and is oriented such that the dither rotation has a component parallel to the input axes of each of the fiber coils. In one embodiment, platform 430 can be oriented to be at the apex of a three axis pyramid so that the dither rotation is applied at about 45 degrees to each coil input axis.

Figure 5A:
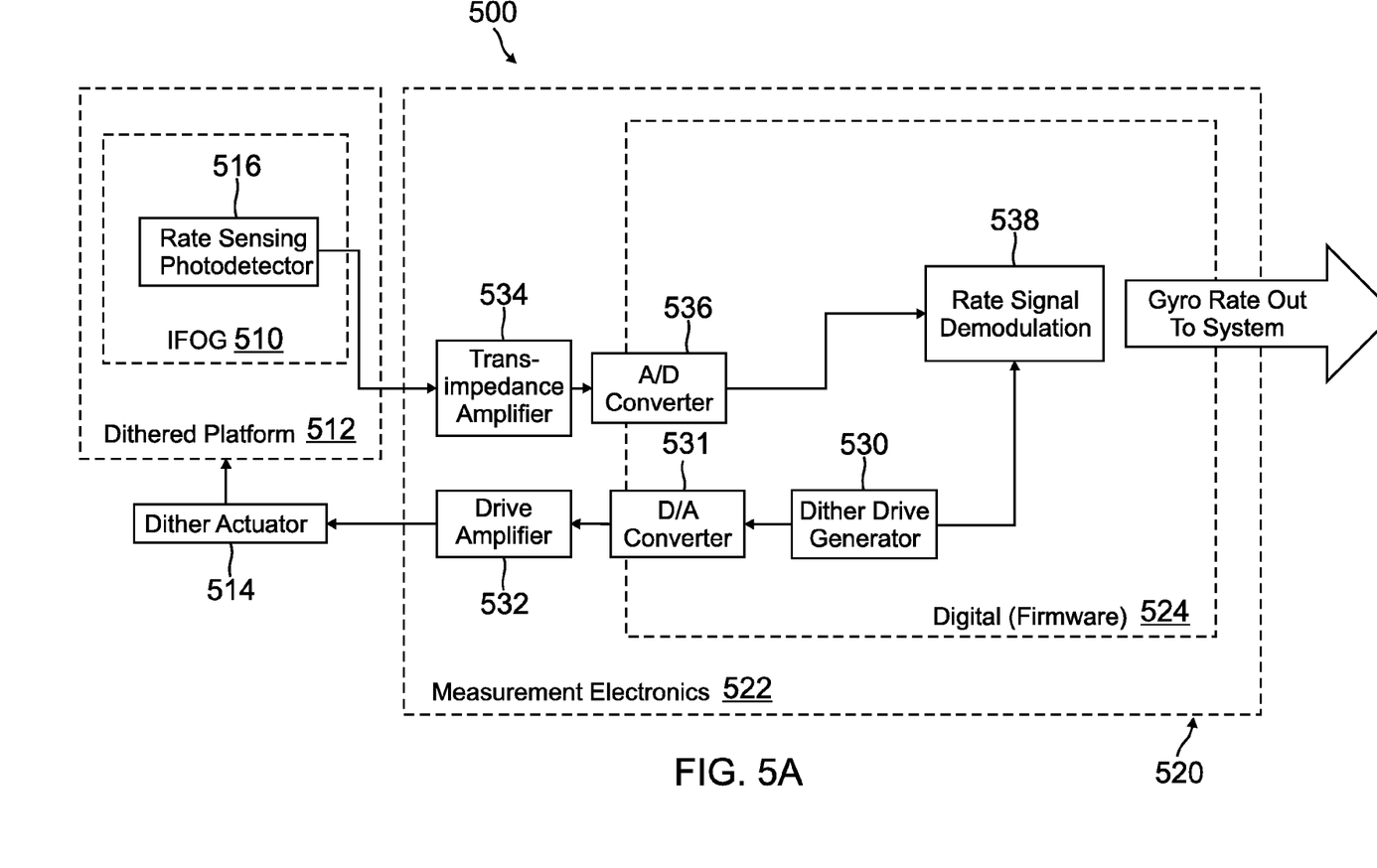
FIG. 5A is a block diagram illustrating a system for rotationally biasing a fiber optic gyroscope according to a further embodiment.

FIG. 5A is a block diagram illustrating a system 500 for rotationally biasing a fiber optic gyroscope such as an IFOG 510 according to one embodiment. The system 500 includes a signal processing unit 520 that can be employed with IFOG 510 for single axis processing. In general, the rate signal from IFOG 510 is demodulated with the same waveform generator used to create a dither. The IFOG 510 is mounted on a dithered platform 512, which is configured to impart a bias rotation angle to IFOG 510. The dithered platform 512 is responsive to a dither actuator 514 that is coupled with signal processing unit 520. The signal processing unit 520 is configured to convert a measured intensity of the optical signal from IFOG 510 to rotation rate data.

The signal processing unit 520 includes a measurement electronics section 522 and a digital section 524 that can be implemented in firmware, for example. A dither drive generator 530 in digital section 524 sends a digital drive signal to a digital to analog (D/A) converter 531, which sends an analog drive signal to a drive amplifier 532 in measurement electronics section 522. An amplified drive signal is output from drive amplifier 532 to dither actuator 514.

A rate sensing photodetector 516 on IFOG 510 outputs a rate signal to a trans-impedance amplifier 534 in measurement electronics section 522. The amplified rate signal from trans-impedance amplifier 534 is sent to an analog to digital (A/D) converter 536, which sends a digital rate signal to a rate signal demodulation unit 538 in digital section 524. The rate signal demodulation unit 538 also receives the drive signal from dither drive generator 530. The rate signal from IFOG 510 is demodulated by the dither signal in rate signal demodulation unit 538. The gyro rate is then output from signal processing unit 520 to a processing system for further use.

Figure 5B:
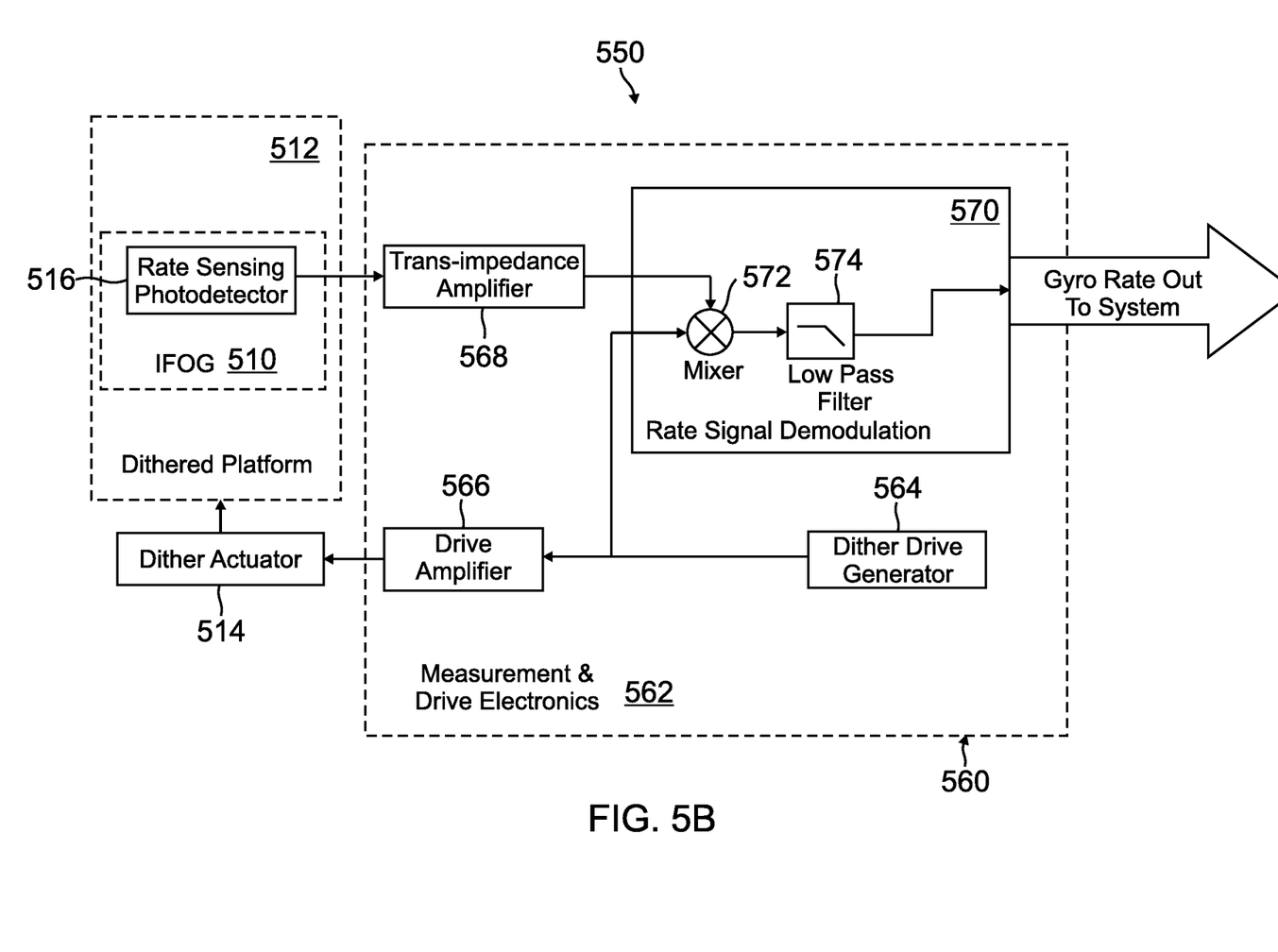
FIG. 5B is a block diagram illustrating a system for rotationally biasing a fiber optic gyroscope according to an alternative embodiment.

FIG. 5B illustrates a system 550 for rotationally biasing a fiber optic gyroscope such as IFOG 510, according to an alternative embodiment, in which a signal processing unit 560 is implemented with analog components for single axis processing. In general, the rate signal from IFOG 510 is again demodulated with the same waveform generator used to create a dither. Again, IFOG 510 is mounted on dithered platform 512, which is configured to impart a bias rotation angle to IFOG 510, and dithered platform 512 is responsive to dither actuator 514 that is coupled with signal processing unit 560.

The signal processing unit 560 includes an analog measurement and drive electronics section 562, and a rate signal demodulation section 570. The drive electronics section 562 includes a dither drive generator 564, which sends a dither drive signal to a drive amplifier 566 and to rate signal demodulation section 570. An amplified dither drive signal is output from drive amplifier 566 to dither actuator 514.

The rate sensing photodetector 516 on IFOG 510 outputs a rate signal to a trans-impedance amplifier 568 in drive electronics section 562. The amplified rate signal from trans-impedance amplifier 568 is sent to a mixer 572 in rate signal demodulation section 570. The mixer 572 also receives the dither drive signal from dither drive generator 564. A mixed rate signal from mixer 572 is then sent to a low pass filter 574, which outputs a demodulated rate signal that is used to output a gyro rate from rate signal demodulation section 570.

Figure 6A:
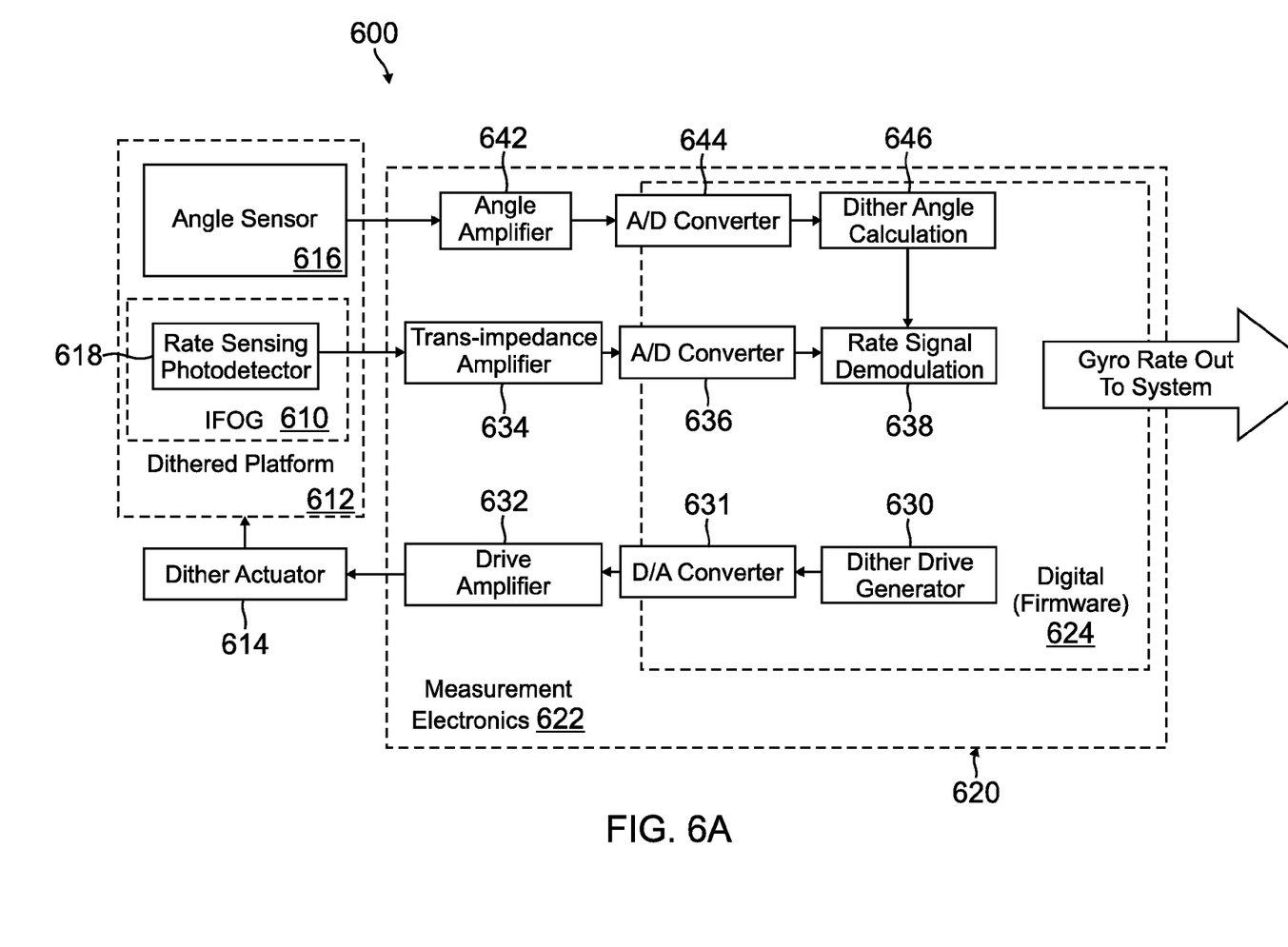
FIG. 6A is a block diagram illustrating a system for rotationally biasing a fiber optic gyroscope according to another embodiment.

FIG. 6A is a block diagram illustrating a system 600 for rotationally biasing a fiber optic gyroscope such as an IFOG 610 according to another embodiment. The system 600 includes a signal processing unit 620 that can be employed with IFOG 610 for single axis processing. In general, the rate signal from IFOG 610 is demodulated by a measured dither signal. The IFOG 610 is mounted on a dithered platform 612, which is configured to impart a bias rotation angle to IFOG 610. The dithered platform 612 is responsive to a dither actuator 614 that is coupled with signal processing unit 620. An angle sensor 616, such as a piezo-electric transducer or an optical encoder, is mounted on dithered platform 612. The angle sensor 616 is used to measure a local angle of dithered platform 612 with respect to a surface on which dithered platform 612 is mounted.

The signal processing unit 620 includes a measurement electronics section 622 and a digital section 624 that can be implemented in firmware, for example. A dither drive generator 630 in digital section 624 sends a digital drive signal to a D/A converter 631, which sends an analog drive signal to a drive amplifier 632 in measurement electronics section 622. An amplified drive signal is output from drive amplifier 632 to dither actuator 614.

A rate sensing photodetector 618 on IFOG 610 outputs a rate signal to a trans-impedance amplifier 634 in measurement electronics section 622. The amplified rate signal from trans-impedance amplifier 634 is sent to a first A/D converter 636, which outputs a digital rate signal to a rate signal demodulation unit 638.

The angle sensor 616 on dithered platform 612 outputs a dither angle signal to an angle amplifier 642 in measurement electronics section 622. The angle amplifier 642 sends the amplified dither angle signal to a second A/D converter 644, which outputs a digital dither signal to a dither angle calculation module 646. The rate of the amplified signal from rate sensing photodetector 618, via A/D converter 636, is rectified in rate signal demodulation unit 638 using the calculated dither angle from dither angle calculation module 646. A gyro rate is then output from signal processing unit 620 for further use.

Figure 6B:
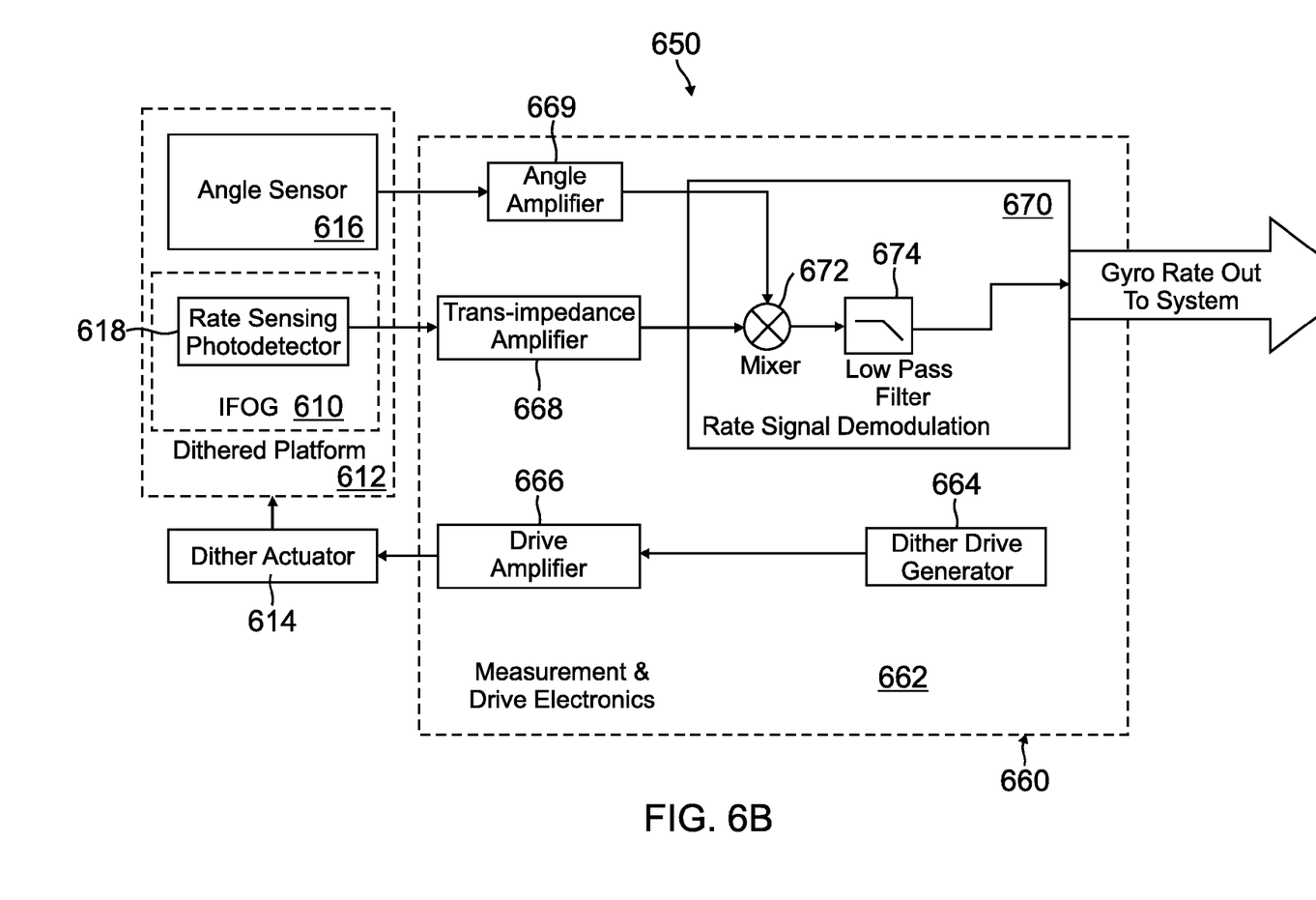
FIG. 6B is a block diagram illustrating a system for rotationally biasing a fiber optic gyroscope according to an alternative embodiment.

FIG. 6B illustrates a system 650 for rotationally biasing a fiber optic gyroscope such as IFOG 610, according to an alternative embodiment, in which a signal processing unit 660 is implemented with analog components for single axis processing. In general, the rate signal from IFOG 610 is again demodulated using the measured dither signal. The IFOG 610 is mounted on dithered platform 612, which is configured to impart a bias rotation angle to IFOG 610, and dithered platform 612 is responsive to dither actuator 614 that is coupled with signal processing unit 660. The angle sensor 616 mounted on dithered platform 612 is again used to measure the angle of dithered platform 612.

The signal processing unit 660 includes an analog measurement and drive electronics section 662, and a rate signal demodulation section 670. The drive electronics section 662 includes a dither drive generator 664, which sends a dither drive signal to a drive amplifier 666. An amplified dither drive signal is output from drive amplifier 666 to dither actuator 614.

The rate sensing photodetector 618 on IFOG 610 outputs a rate signal to a trans-impedance amplifier 668 in drive electronics section 662. The amplified rate signal from trans-impedance amplifier 668 is sent to a mixer 672 in rate signal demodulation section 670. The angle sensor 616 on dithered platform 612 outputs a dither signal to an angle amplifier 669 in measurement electronics section 662. The angle amplifier 669 sends the amplified dither signal to mixer 672. A mixed rate signal from mixer 672 is then sent to a low pass filter 674, which outputs a demodulated rate signal that is used to output a gyro rate signal from rate signal demodulation section 670. The rate signal demodulation section 670 strips out imperfections in dither actuator 614 and angle amplifier 669.

Figure 7:
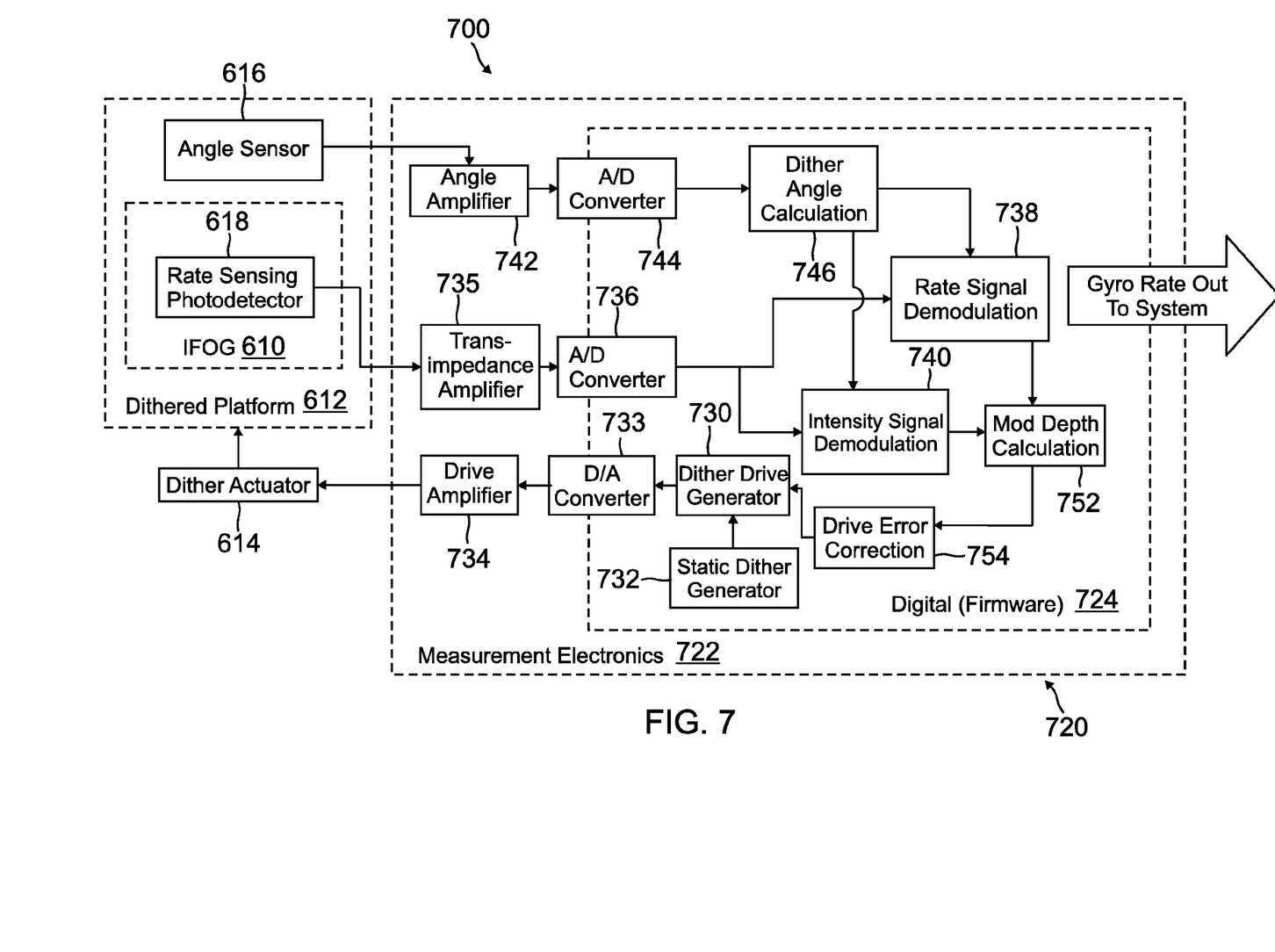
FIG. 7 is a block diagram illustrating a system for rotationally biasing a fiber optic gyroscope according to a further embodiment.

FIG. 7 is a block diagram illustrating a system 700 for rotationally biasing a fiber optic gyroscope such as IFOG 610 according to another embodiment. The system 700 includes a signal processing unit 720 that can be employed with IFOG 610 for single axis processing. The IFOG 610 is again mounted on dithered platform 612, which is configured to impart a bias rotation angle to IFOG 610, and dithered platform 612 is responsive to dither actuator 614 that is coupled with signal processing unit 720. The angle sensor 616 mounted on dithered platform 612 is again used to measure the angle of dithered platform 612.

The signal processing unit 720 includes a measurement electronics section 722 and a digital section 724 that can be implemented in firmware, for example. In digital section 724, a dither drive generator 730 receives a signal from a static dither generator 732 and outputs a digital drive signal to a D/A converter 733, which sends an analog drive signal to a drive amplifier 734 in measurement electronics section 722. An amplified drive signal is output from drive amplifier 734 to dither actuator 614.

The rate sensing photodetector 618 on IFOG 610 outputs a rate signal to a trans-impedance amplifier 735 in measurement electronics section 722. The amplified rate signal from trans-impedance amplifier 735 is sent to an A/D converter 736, which outputs a digital rate signal to a rate signal demodulation unit 738 and an intensity signal demodulation unit 740 in digital section 724.

The angle sensor 616 on dithered platform 612 outputs a dither signal to an angle amplifier 742 in measurement electronics section 722. The angle amplifier 742 sends the amplified dither signal to an A/D converter 744, which outputs a digital dither signal to a dither angle calculation module 746. The rate and intensity of the amplified signal returning from rate sensing photodetector 618, via A/D converter 736, is rectified in signal demodulation units 738 and 740 using the calculated dither angle from dither angle calculation module 746.

The rate signal from IFOG 610 is demodulated in rate signal demodulation unit 738, and the intensity signal from IFOG 610 is demodulated in intensity signal demodulation unit 740. By demodulation of the signal using the calculated dither angle, dither induced noise is effectively cancelled.

A modulation depth calculation module 752 receives the demodulated rate signals from both of signal demodulation units 738 and 740. The demodulated signals are used to calculate the effective modulation depth in order to keep the dither amplitude near an optimal operating value. The modulation depth calculation module 752 then outputs a modulation depth signal to a drive error correction module 754. The dither drive generator 730 is updated with a modulation depth error signal from error correction module 754, effectively forming a closed loop servo which corrects for any drive instability. A gyro rate signal is output from digital section 724 of signal processing unit 720 for further use.

The following equations illustrate the signal processing functions used in rotationally biasing an IFOG according to the present approach. The phase dependent portion of the interference pattern at the rate sensing detector can be defined by the following equation, for the simplest case in which power is evenly split between the two branches of the optical coil:

$$I(t) = \frac{I_0}{2}(1 + \cos\Delta\phi). \quad (1)$$

Here, I is the detected intensity at the rate sensing detector, and $\Delta\phi$ is the total phase shift due to both biasing rotation of the dithered platform and rotation of the sensor. The Sagnac phase shift due to rotation can be defined as follows:

$$\Delta\phi = \frac{2\pi LD}{\lambda c} \cdot \Omega = SF \cdot \Omega \quad (2)$$

where L is the longitudinal length of the fiber coil, D is the diameter of the fiber coil, $\lambda$ is the mean wavelength of light propagating in the fiber coil, c is the speed of light, $\Omega$ is the total rotation rate, and SF represents the gyro scale factor. The total rotation rate $\Omega$ is the sum of the biasing rotation $\Omega_B$ and the rotation rate to be measured $\Omega_0$, expressed as follows:

$$\Omega(t) = \Omega_0 + \Omega_B(t). \quad (3)$$

The loop transit time $\tau$, which is the time of transit for a light wave from one end of the fiber coil to the other, is defined by the following equation:

$$\tau = \frac{nL}{c} \quad (4)$$

where n is fiber index of refraction. For a time-varying rotation (and thus angle), the phase shift $\Delta\phi_B$ due to biasing rotation (dither), of the interferometer may be expressed as:

$$\Delta\phi_B(t) = SF \cdot \Omega_B(t) = SF \cdot \left[\frac{\theta(t) - \theta(t-\tau)}{\tau}\right] = \frac{2\pi D}{\lambda n} \cdot [\theta(t) - \theta(t-\tau)] \quad (5)$$

where $\theta(t)$ is the dither angle, and t is time. A sinusoidal dither angle is assumed according the following equation:

$$\theta(t) = A_\theta \cos(\omega_B t) \quad (6)$$

where $\omega_B$ is the dither frequency (rad/sec), and $A_\theta$ is the angular dither amplitude. A phase due to bias is then expressed as follows:

$$\Delta\phi_B(t) = \frac{-4\pi D}{\lambda n} \cdot A_\theta \sin\left(\frac{\omega_B \tau}{2}\right)\sin\left(\omega_B t - \frac{\omega_B \tau}{2}\right). \quad (7)$$

The constants $\alpha$ and $\delta$ are then defined to simplify equation (7) as follows:

$$\delta = \frac{\omega_B \tau}{2} \quad (8)$$

$$\alpha = \frac{-4\pi D}{\lambda n} \cdot A_\theta \cdot \sin\delta. \quad (9)$$

The phase bias can then be defined by the following equation:

$$\Delta\phi_B(t) = \alpha \sin(\omega_B t - \delta). \quad (10)$$

Combining equation (10) with the interference equation (1) and using the Bessel function expansion gives the following expression (11):

$$I(t) = \frac{I_0}{2}\left\{\begin{array}{l}1 + \cos\Delta\phi_S \cdot \left[J_0(\alpha) + 2\sum_{n=1}^{\infty} J_{2n}(\alpha)\cos\{2n(\omega_b t - \delta)\}\right] - \\ \sin\Delta\phi_S \cdot 2\sum_{n=1}^{\infty} J_{2n-1}(\alpha)\cos\{(2n-1)(\omega_b t - \delta)\}\end{array}\right\}$$

where $\Delta\phi_S$ is the Sagnac phase shift due to the rotation being measured, and Jn represents the n-th Bessel function of the 1st kind. Demodulating at the dither frequency yields the first harmonic intensity signal, $S_\omega$, as follows:

$$S_\omega \propto -I_0 J_1(\alpha) \sin \Delta\phi_S. \quad (12)$$

Equation 12 defines the signal at the carrier frequency to be measured, because it is sinusoidal in rate (i.e., it has sign discrimination and maximum sensitivity). Equation 13 defines the demodulated signal at the intensity demodulation unit, wherein the second harmonic of the dither frequency gives a term, $S_{2\omega}$, proportional to the cosine of the Sagnac phase shift:

$$S_{2\omega} \propto I_0 J_2(\alpha) \cos \Delta\phi_S. \quad (13)$$

For small rotation rates, the cos $\Delta\phi_S$ term becomes approximately equal to 1 and the demodulated signal is effectively proportional to only the optical intensity and the $2^{nd}$ Bessel function of the modulation depth. At a fixed optical intensity, this signal may be exploited to calculate the effective phase modulation depth of the dither.

Figure 8:
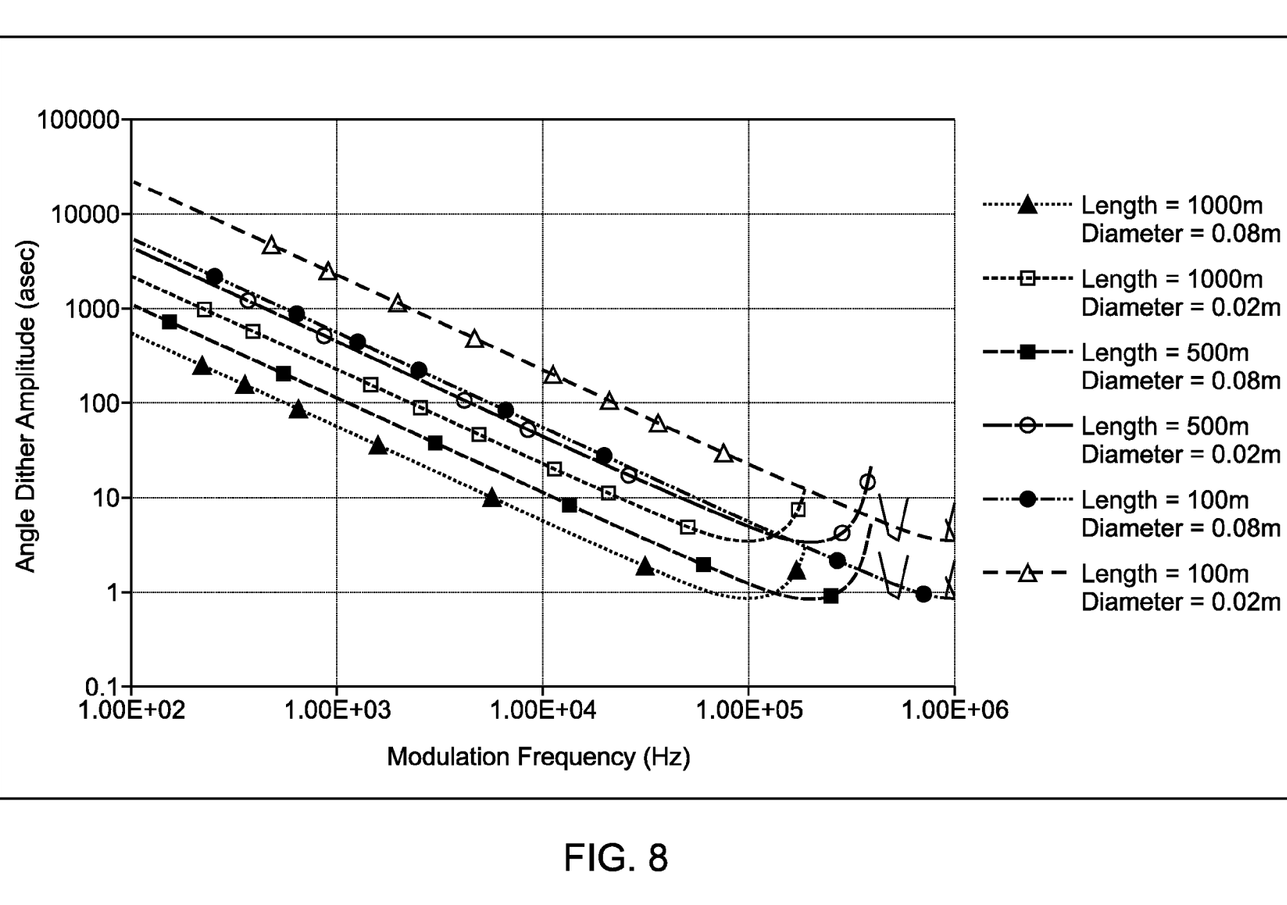
FIG. 8 is a graph showing the dither angular amplitude needed with respect to modulation frequency to achieve a maximum signal strength in a fiber optic gyroscope.

FIG. 8 is a graph illustrating the dither angular amplitude needed with respect to modulation frequency to achieve a maximum signal strength (peak of $J_1$) for various fiber coil lengths and diameters. FIG. 8 shows that for many practical lengths of fiber, the optimal dither frequency is within the useable range of standard piezo-electric transducers and motors capable of imparting rotational motion.

A computer or processor used in the present system and method can be implemented using software, firmware, hardware, or any appropriate combination thereof, as known to one of skill in the art. These may be supplemented by, or incorporated in, specially-designed application-specific integrated circuits (ASICs) or field programmable gate arrays (FPGAs). The computer or processor can also include functions with software programs, firmware, or other computer readable instructions for carrying out various process tasks, calculations, and control functions used in the present method and system.

The present methods can be implemented by computer executable instructions, such as program modules or components, which are executed by at least one processor. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer- or processor-readable instructions. These instructions are typically stored on any appropriate computer program product that includes a computer readable medium used for storage of computer readable instructions or data structures. Such a computer readable medium can be any available media that can be accessed by a general purpose or special purpose computer or processor, or any programmable logic device.

Suitable processor-readable media may include storage or memory media such as magnetic or optical media. For example, storage or memory media may include conventional hard disks, compact disks, DVDs, Blu-ray discs, or other optical storage disks; volatile or non-volatile media such as Random Access Memory (RAM); Read Only Memory (ROM), Electrically Erasable Programmable ROM (EEPROM), flash memory, and the like; or any other media that can be used to carry or store desired program code in the form of computer executable instructions or data structures.

Example Embodiments

Example 1 includes a system for rotationally biasing a fiber optic gyroscope, the system comprising: a fiber optic gyroscope assembly comprising a light source configured to emit an optical signal; an optical coupler in optical communication with the light source; a fiber optic coil in optical communication with the light source, the fiber optic coil configured to receive the optical signal through the optical coupler and impart a phase shift proportional to rotation; and a rate sensing detector in optical communication with the fiber optic coil and configured to receive the optical signal from the fiber optic coil through the optical coupler; a motor operatively coupled to the fiber optic coil and configured to apply a periodic rotation to the fiber optic coil to impart a biasing phase modulation to the optical signal; and a signal processing unit operatively coupled to the fiber optic gyroscope assembly and the motor, the signal processing unit configured to convert a measured intensity of the optical signal to rotation rate data.

Example 2 includes the system of Example 1, further comprising a platform operatively coupled to the motor, wherein at least a portion of the fiber optic gyroscope assembly that includes the fiber optic coil is mounted on the platform.

Example 3 includes the system of any of Examples 1-2, wherein the light source comprises a laser, a fiber light source, or a superluminescent diode.

Example 4 includes the system of any of Examples 1-3, wherein the fiber optic gyroscope assembly comprises an interferometric fiber optic gyroscope (IFOG).

Example 5 includes the system of any of Examples 1-4, wherein the motor imparts a periodic rotational motion to the platform.

Example 6 includes the system of any of Examples 1-5, wherein the motor comprises a stepper motor or a piezoelectric motor.

Example 7 includes the system of any of Examples 1-6, wherein the rate sensing detector converts the optical signal from the fiber optic coil to an electrical rate signal that is sent to the signal processing unit for rotation rate calculation.

Example 8 includes the system of Example 7, wherein the signal processing unit comprises: a dither drive generator; a drive amplifier configured to receive a dither drive signal from the dither drive generator, the drive amplifier operatively coupled to a dither actuator on the motor; a trans-impedance amplifier configured to receive the electrical rate signal from the rate sensing detector; and a rate signal demodulation unit configured to receive an amplified rate signal from the trans-impedance amplifier and output a demodulated rate signal.

Example 9 includes the system of Example 8, wherein the dither drive generator sends a digital drive signal to a digital to analog converter, which outputs an analog drive signal to the drive amplifier; and the trans-impedance amplifier sends an amplified rate signal to an analog to digital converter, which outputs a digital rate signal to the rate signal demodulation unit to demodulate the rate signal via the dither drive signal.

Example 10 includes the system of Examples 8, wherein the rate signal demodulation unit comprises: a mixer configured to receive the dither drive signal from the dither drive generator and the amplified rate signal from the trans-impedance amplifier; and a low pass filter configured to receive a mixed rate signal from the mixer, and output the rate signal demodulated via the dither drive signal.

Example 11 includes the system of Example 8, further comprising an angle sensor mounted on the platform, and the signal processing unit further comprising an angle amplifier configured to receive a dither angle signal from the angle sensor.

Example 12 includes the system of Example 11, wherein the dither drive generator sends a digital drive signal to a digital to analog converter, which outputs an analog drive signal to the drive amplifier; the trans-impedance amplifier sends an amplified rate signal to a first analog to digital converter, which outputs a digital rate signal to the rate signal demodulation unit; and the angle amplifier sends an amplified dither angle signal to a second analog to digital converter, which outputs a digital dither angle signal to a dither angle calculation module; wherein the rate signal demodulation unit receives a calculated dither angle signal from the dither angle calculation module, and rectifies the digital rate signal using the calculated dither angle.

Example 13 includes the system of Example 11, wherein the rate signal demodulation unit comprises a mixer configured to receive the amplified rate signal from the trans-impedance amplifier, and an amplified dither angle signal from the angle amplifier; and a low pass filter configured to receive a mixed rate signal from the mixer, and output the rate signal demodulated via the dither angle signal.

Example 14 includes the system of Example 12, wherein the signal processing unit further comprises: an intensity signal demodulation unit configured to receive the digital rate signal from the first analog to digital converter, and the dither angle signal from the dither angle calculation module; a modulation depth calculation module configured to receive the demodulated rate signal from the signal demodulation unit, and a demodulated intensity signal from the intensity signal demodulation unit; and a drive error correction module configured to receive a modulation depth signal from the modulation depth calculation module; wherein the dither drive generator is updated with an error correction signal from the drive error correction module to keep a dither amplitude near an optimal operating value.

Example 15 includes a system for rotationally biasing multiple fiber optic gyroscopes, the system comprising: a multi-axis fiber optic gyroscope assembly comprising at least one light source configured to emit an optical signal; a set of optical couplers each in optical communication with the light source; a set of fiber optic coils each in optical communication with the light source, the fiber optic coils each configured to receive the optical signal through a respective one of the optical couplers and impart a phase shift proportional to rotation; and a set of rate sensing detectors each in optical communication with a respective one of the fiber optic coils, the rate sensing detectors each configured to receive the optical signal from the respective one of the fiber optic coils through a respective one of the optical couplers; a platform on which at least a portion of the multi-axis fiber optic gyroscope assembly is mounted that includes the fiber optic coils; a dither motor operatively coupled to the platform and configured to apply a dithering motion to the platform to impart a periodic rotation having a rotational component along an input axis of each of the fiber optic coils, thereby imparting a biasing phase modulation to each of the optical signals; and a signal processing unit operatively coupled to the multi-axis fiber optic gyroscope assembly and the dither motor, the signal processing unit configured to convert measured intensities of the optical signals to rotation rate data.

Example 16 includes the system of Example 15, wherein the multi-axis fiber optic gyroscope assembly comprises multiple interferometric fiber optic gyroscopes.

Example 17 includes the system of any of Examples 15-16, wherein the fiber optic coils have substantially orthogonal input axes such that the multi-axis fiber optic gyroscope assembly comprises a full attitude reference apparatus.

Example 18 includes the system of Example 17, wherein the platform is configured such that the dithering motion is applied at an angle of about 45 degrees to each coil axis.

Example 19 includes a method for rotationally biasing one or more fiber optic gyroscopes, the method comprising: rotating a fiber optic coil of the one or more fiber optic gyroscopes through a predetermined periodic angle to impart a biasing phase modulation to an optical signal in the fiber optic coil; and converting a measured intensity of the optical signal to rotation rate data.

Example 20 includes the method of Example 19, wherein the fiber optic gyroscopes are part of a multi-axis fiber optic gyroscope assembly in which the fiber optic coils have substantially orthogonal input axes.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A system for rotationally biasing a fiber optic gyroscope, the system comprising:
   a fiber optic gyroscope assembly comprising:
      a light source configured to emit an optical signal;
      an optical coupler in optical communication with the light source;
      a fiber optic coil in optical communication with the light source, the fiber optic coil configured to receive the optical signal through the optical coupler and impart a phase shift proportional to rotation; and
      a rate sensing detector in optical communication with the fiber optic coil and configured to receive the optical signal from the fiber optic coil through the optical coupler;
   a motor operatively coupled to the fiber optic coil and configured to apply a periodic rotation to the fiber optic coil to impart a biasing phase modulation to the optical signal;
   a platform operatively coupled to the motor, wherein at least a portion of the fiber optic gyroscope assembly that includes the fiber optic coil is mounted on the platform;
   an angle sensor mounted on the platform; and
   a signal processing unit operatively coupled to the fiber optic gyroscope assembly and the motor, the signal processing unit comprising an angle amplifier configured to receive a dither angle signal from the angle sensor, the signal processing unit configured to convert a measured intensity of the optical signal to rotation rate data.

2. The system of claim 1, wherein the light source comprises a laser, a fiber light source, or a superluminescent diode.

3. The system of claim 1, wherein the fiber optic gyroscope assembly comprises an interferometric fiber optic gyroscope (IFOG).

4. The system of claim 1, wherein the motor imparts a periodic rotational motion to the platform.

5. The system of claim 4, wherein the motor comprises a stepper motor or a piezo-electric motor.

6. The system of claim 1, wherein the rate sensing detector converts the optical signal from the fiber optic coil to an electrical rate signal that is sent to the signal processing unit for rotation rate calculation.

7. The system of claim 6, wherein the signal processing unit comprises:
   a dither drive generator;
   a drive amplifier configured to receive a dither drive signal from the dither drive generator, the drive amplifier operatively coupled to a dither actuator on the motor;
   a trans-impedance amplifier configured to receive the electrical rate signal from the rate sensing detector; and
   a rate signal demodulation unit configured to receive an amplified rate signal from the trans-impedance amplifier and output a demodulated rate signal.

8. The system of claim 7, wherein:
   the dither drive generator sends a digital drive signal to a digital to analog converter, which outputs an analog drive signal to the drive amplifier; and
   the trans-impedance amplifier sends an amplified rate signal to an analog to digital converter, which outputs a digital rate signal to the rate signal demodulation unit to demodulate the rate signal via the dither drive signal.

9. The system of claim 7, wherein the rate signal demodulation unit comprises:

a mixer configured to receive the dither drive signal from the dither drive generator and the amplified rate signal from the trans-impedance amplifier; and a low pass filter configured to receive a mixed rate signal from the mixer, and output the rate signal demodulated via the dither drive signal.

10. The system of claim 7, wherein:

the dither drive generator sends a digital drive signal to a digital to analog converter, which outputs an analog drive signal to the drive amplifier;

the trans-impedance amplifier sends an amplified rate signal to a first analog to digital converter, which outputs a digital rate signal to the rate signal demodulation unit; and the angle amplifier sends an amplified dither angle signal to a second analog to digital converter, which outputs a digital dither angle signal to a dither angle calculation module;

wherein the rate signal demodulation unit receives a calculated dither angle signal from the dither angle calculation module, and rectifies the digital rate signal using the calculated dither angle.

11. The system of claim 7, wherein the rate signal demodulation unit comprises:

a mixer configured to receive the amplified rate signal from the trans-impedance amplifier, and an amplified dither angle signal from the angle amplifier; and a low pass filter configured to receive a mixed rate signal from the mixer, and output the rate signal demodulated via the dither angle signal.

12. The system of claim 10, wherein the signal processing unit further comprises:

an intensity signal demodulation unit configured to receive the digital rate signal from the first analog to digital converter, and the dither angle signal from the dither angle calculation module;

a modulation depth calculation module configured to receive the demodulated rate signal from the signal demodulation unit, and a demodulated intensity signal from the intensity signal demodulation unit; and a drive error correction module configured to receive a modulation depth signal from the modulation depth calculation module;

wherein the dither drive generator is updated with an error correction signal from the drive error correction module to keep a dither amplitude near an optimal operating value.

13. A system for rotationally biasing multiple fiber optic gyroscopes, the system comprising:

a multi-axis fiber optic gyroscope assembly comprising:

at least one light source configured to emit an optical signal;

a set of optical couplers each in optical communication with the light source;

a set of fiber optic coils each in optical communication with the light source, the fiber optic coils each configured to receive the optical signal through a respective one of the optical couplers and impart a phase shift proportional to rotation; and a set of rate sensing detectors each in optical communication with a respective one of the fiber optic coils, the rate sensing detectors each configured to receive the optical signal from the respective one of the fiber optic coils through a respective one of the optical couplers;

a platform on which at least a portion of the multi-axis fiber optic gyroscope assembly is mounted that includes the fiber optic coils;

an angle sensor mounted on the platform;

a dither motor operatively coupled to the platform and configured to apply a dithering motion to the platform to impart a periodic rotation having a rotational component along an input axis of each of the fiber optic coils, thereby imparting a biasing phase modulation to each of the optical signals; and a signal processing unit operatively coupled to the multi-axis fiber optic gyroscope assembly and the dither motor, the signal processing unit comprising an angle amplifier configured to receive a dither angle signal from the angle sensor, the signal processing unit configured to convert a measured intensity of the optical signal to rotation rate data.

14. The system of claim 13, wherein the multi-axis fiber optic gyroscope assembly comprises multiple interferometric fiber optic gyroscopes.

15. The system of claim 13, wherein the fiber optic coils have substantially orthogonal input axes such that the multi-axis fiber optic gyroscope assembly comprises a full attitude reference apparatus.

16. The system of claim 15, wherein the platform is configured such that the dithering motion is applied at an angle of about 45 degrees to each coil axis.

* * * * *